United States Patent
Kotlarski

(10) Patent No.: US 6,327,739 B1
(45) Date of Patent: Dec. 11, 2001

(54) WIPE DEVICE FOR WINDOWS OF MOTOR VEHICLES, HAVING AN ELONGATED WIPER ARM, WHICH IS GUIDED AT ONE END ON THE MOTOR VEHICLE AND IS DRIVEN

(75) Inventor: Thomas Kotlarski, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/331,522
(22) PCT Filed: Oct. 23, 1998
(86) PCT No.: PCT/DE98/03112
§ 371 Date: Oct. 19, 2000
§ 102(e) Date: Oct. 19, 2000
(87) PCT Pub. No.: WO99/25591
PCT Pub. Date: May 27, 1999

(30) Foreign Application Priority Data

Nov. 13, 1997 (DE) ............................................. 197 50 190

(51) Int. Cl.$^7$ ....................................................... B60S 1/32
(52) U.S. Cl. ....................................................... 15/250.351
(58) Field of Search ....................... 15/250.351, 250.352, 15/250.32, 250.31

(56) References Cited

U.S. PATENT DOCUMENTS

| | | | |
|---|---|---|---|
| 1,362,175 | * 12/1920 | Oishei | 15/250.351 |
| 4,133,071 | * 1/1979 | Jaske | 15/250.351 |
| 5,724,699 | * 3/1998 | Bexten | 15/250.351 |

FOREIGN PATENT DOCUMENTS

| | | |
|---|---|---|
| 1 905 352 | 7/1973 | (DE) . |
| 34 20 274 A1 | 1/1985 | (DE) . |
| 4142163 | * 7/1992 | (DE) ............................... 15/250.351 |
| 1012968 | * 7/1952 | (FR) ............................... 15/250.352 |

* cited by examiner

Primary Examiner—Gary K. Graham
(74) Attorney, Agent, or Firm—Michael J. Striker

(57) ABSTRACT

The invention relates to a wiper device for windows of motor vehicles, having an elongated, driven wiper arm (10) guided at one end on the motor vehicle, on whose other free end section an elongated wiper blade, which operates on the window, is hinged so it can oscillate in a longitudinal axially parallel manner and around a pivot axis (44) oriented transversely to the longitudinal axes. A section (38) of the wiper blade (14) is guided between two legs (34, 36), which are arranged at a distance from each other, of a connecting device (12), and hinge means of the wiper blade cooperate with hinge means of the wiper blade connecting device (12) arranged on one end of a wiper blade connecting rod, while the connecting rod is provided at its other end with a first hinge element (18), which is a part of a tilt hinge (20), and the drive means (24) of the wiper device act on the other second hinge element. A particularly advantageous wiper device results, if the wiper arm connecting rod (16, or respectively 116, or respectively 216) and the connecting device (12) for the wiper blade have been produced in one piece from a sheet metal plate.

4 Claims, 1 Drawing Sheet

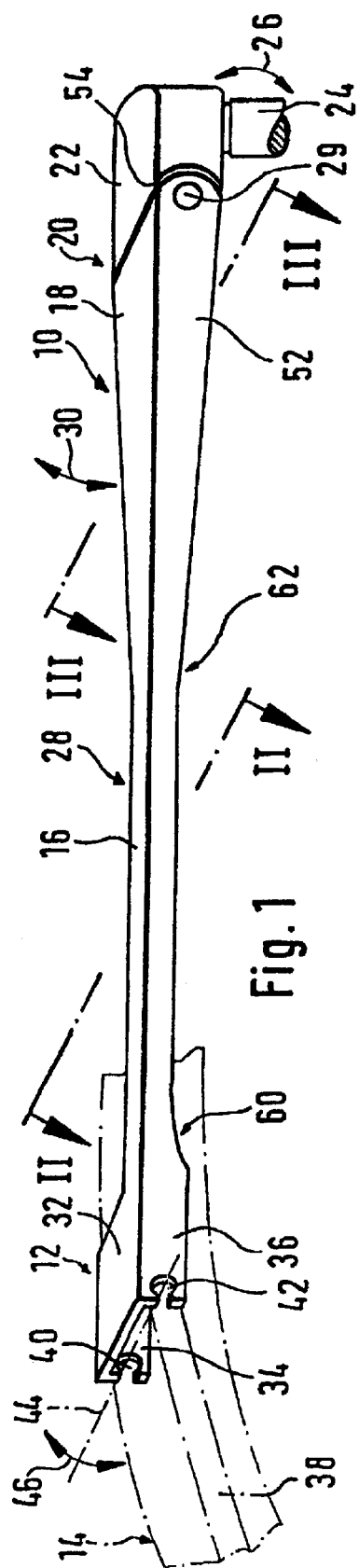
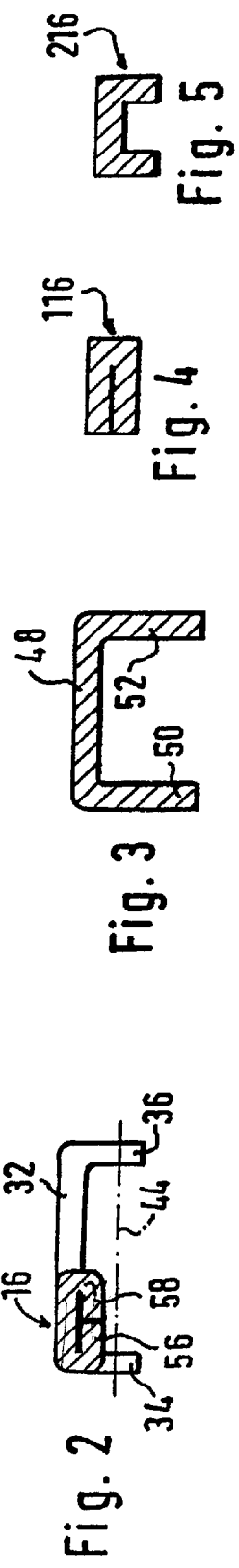
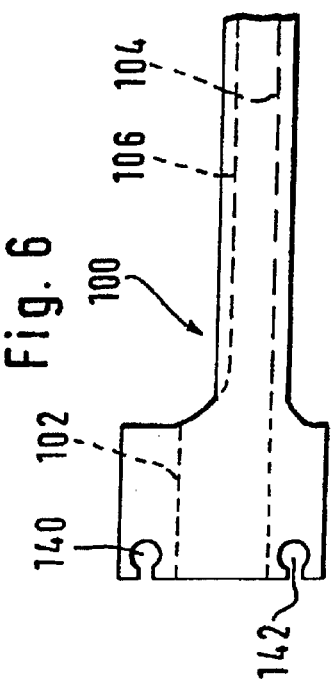

WIPE DEVICE FOR WINDOWS OF MOTOR VEHICLES, HAVING AN ELONGATED WIPER ARM, WHICH IS GUIDED AT ONE END ON THE MOTOR VEHICLE AND IS DRIVEN

BACKGROUND OF THE INVENTION

The invention relates to a wiper device. In a known wiper device of this type (DE- AS 19 05 352), the connecting device for the wiper blade is made of a sheet metal piece and provided with a plug-in bushing, into which the solid, prefabricated connecting rod must be inserted and fastened in a further process step. Besides the thickening expense needed for this, it is furthermore disadvantageous that this plug-in connection between the connecting device and the connecting rod unnecessarily increases the mass which needs to be accelerated and braked during the wiping process, something which needs to be taken into consideration by an appropriate layout of the drive components for the wiper device.

SUMMARY OF THE INVENTION

It is therefore an object of the present invention to provide a wiper device which avoids the disadvantages of the prior art.

In keeping with these objects and with others which will become apparent hereinafter, in the present invention the wiper arm connecting rod and the connecting device for the wiper blade are produced in one piece from a sheet metal plate which is folded in two layers in a region of the connecting rod.

With the wiper device in accordance with the invention, the connecting device for the wiper arm and the connecting rod can be produced in a single process step. The arrangement of a plug-in bushing is omitted. A weight reduction is the result of this—also in view of the omission of a solid connecting rod—which has space-saving and cost-effective results in the layout of the drive components.

With another known wiper device (DE 34 20 274 A1), the first hinge element of the tilt hinge is U-shaped in cross section and made of a sheet metal piece and is riveted in the area of an overlapping section between the hinge element and the solid prefabricated connecting rod to the latter. The production outlay required for this is considerable. Moreover, the overlapping section increases the mass which must be accelerated and braked in the course of the wiping action, which makes the layout of the drive components more expensive.

In accordance with another embodiment of the present invention, the wiper arm connecting rod and the first hinge element of the tilt hinge are produced in one piece from a sheet metal plate which is folded in two layers in a region of the connecting rod.

With the wiper device in accordance with this embodiment of the invention, the connecting rod of the wiper and the first hinge element of the tilt hinge can be produced in a cost-effective manner in a single production step. Special fastening means and an overlapping section can be omitted. The weight savings resulting from this and from the omission of a solid connecting rod allow a cost-effective layout of the drive components of the wiper device.

A particularly advanced further embodiment of the invention results if the wiper arm connecting rod, the connecting device for the wiper blade and the first hinge element of the tilt hinge are made from sheet metal in one piece, because in this case the advantages of the above mentioned individual steps are complemented in a logical manner.

To increase the stability of the wiper arm in the area of the wiper arm connecting rod, the latter is stiffened by deformations of the sheet metal. By means of these deformations it is possible to multiply the wiper stage and the bending moments over the entire wiper arm range.

Further advantageous developments and embodiments of the invention are recited in the following description and in the exemplary embodiments represented in the associated drawings.

BRIEF DESCRIPTION OF THE DRAWINGS

Shown in the drawings are in:

FIG. 1, a wiper arm, which is a component of a wiper device, along with its drive means, and a wiper blade, indicated by dash-dotted lines, in a perspective view, FIG. 2, a section through a wiper arm in FIG. 1 along the line II—II in an enlarged representation, FIG. 3, the section surface, represented in enlargement, of a section along the line III—III in FIG. 1, FIG. 4, another cross-sectional embodiment, differing from FIG. 2, of the wiper arm in the area of the wiper arm connecting rod, FIG. 5, a further possible cross-sectional embodiment, differing from FIG. 2, of the wiper arm in the area of the wiper arm connecting rod, FIG. 6, a top view of a portion of a sheet metal plate from which the connecting device and the connecting rod are made, and FIG. 7, a top view of a portion of a sheet metal plate from which the connecting device and the first hinge element of the tilt hinge are made.

DESCRIPTION OF THE PREFERRED EMBODIMENTS

Parts of a wiper arm 10 represented in FIG. 1 are a connecting device 12, with the aid of which an elongated wiper blade 14, indicated by dash-dotted lines, can be hingedly connected with the wiper arm. The connecting device 12 is arranged at one end of a wiper arm connecting rod 16. The other end of the wiper arm connecting rod 16 is connected with a first hinge element 18, which is a part of a tilt hinge 20 of the wiper arm. Moreover, a second hinge element 22, on which drive means 24 for the wiper arm 10 act, is also a part of the wiper arm 10. The drive means are constituted by a wiper shaft, which is oscillatingly driven in the direction of the two-headed arrow 26. Together with the wiper arm connecting rod 16 and the first hinge element 18, the connecting device 12 constitutes a hinge lever 28 which, together with the wiper blade 14, can be tilted around the hinge axis 29, which essentially extends parallel with the window surface, in the direction of the two-headed arrow 30, so that the wiper blade 14 can be lifted off the window as well as placed back on it. Thus, the hinge movement essentially takes place in a plane extending vertically from the window surface. The wiper shaft 24 is seated on the motor vehicle, so that the second hinge element 22 of the tilt hinge 20 constitutes the end of the wiper arm 10 on the driven side, on whose free end the connecting device 12 is arranged. As shown in FIGS. 1 and 2, the connecting device 12 has an essentially U-shaped cross section. The U-base 32 of the connecting device 12 essentially extends in a plane parallel with the window. The two U-legs 34 and 36 extend from the U-base toward the window. Between the two U-legs 34 and 36 of the connecting device 12, which are located at a distance from each other, lies a section of the back portion 38 of the elongated wiper blade 14, on which hinge means, not shown in detail, for example hinge pins, are arranged, which project into seating recesses 40 and 42, also constituting hinge means, of the connecting device 12. Here, the hinge means on the back portion 38 of the wiper blade 14 and the seating recesses 40, 42 in the two U-legs 34, 36 of the connecting device 12 are arranged in such a way that a hinge axis 44 results, which essentially lies parallel with the window surface and transversely to the longitudinal axes of the longitudinally parallel elements 14 and 28 of the wiper device. The wiper blade 14 can perform a pivoting motion (two-headed arrow 46) around this hinge axis, by means of which the wiper blade can be adapted during the wiping operation to the changing surface contours, in particular in connection with spherically curved windows of motor vehicles. The two U-legs 34 and 36 see to a correct guidance of the wiper blade 14 during the wiping operation.

As can be seen from FIGS. 1 and 3, the first hinge element 18 of the tilt hinge 20 also has a U-shaped cross section. It therefore also has a U-base 48 and two U-legs 50 and 52, placed at a distance from each other and extending from the U-base toward the window. The seating of the tilt hinge on the hinge lever side is arranged in these two U-legs 50 and 52, while the hinge element 22 dips with a shoulder 54 between these two U-legs and is provided with the seating on the drive side.

As FIG. 1 shows, the hinge lever 28 is made of a single piece. The U-base 32 of the connecting device 12 makes a transition into the wiper arm connecting rod 16, which in turn makes a transition into the U-base 48 of the first hinge element 18. The U-legs 34 and 36 of the connecting device 12 also extend in one piece via the wiper arm connecting rod 16 and make a transition into the U-legs 50, 52 of the first hinge element 18. In accordance with a first embodiment, the U-legs 34, 36 of the connecting element 12 and the U-legs 50, 52 are folded together with their free ends 56 and 58 in the area of the wiper arm connecting rod 16, as can be seen in FIG. 2. This stiffening fold is gradually formed in the transition areas 60 between the connecting device 12 and the wiper arm connecting rod 16, or respectively in the transition area 62 between the wiper arm connecting rod 16 and the first hinge element 18. Independently of the embodiment of the stiffening deformation of the wiper arm connecting rod 16 represented in FIG. 2, such can also be produced in accordance with FIG. 4 (11*b*), or respectively 5 (21*b*). Further embodiments of the fold are conceivable. The purpose of all possible deformations is the achievement of the required stiffness of the hinge lever 28. The thickness of the sheet metal, from which the entire hinge lever 12, 16, 18 is made in one piece, can of course also contribute to this.

Independently of the embodiment of the hinge lever 28, or respectively 12, 16, 18, drawn in FIG. 1, it is also conceivable that only the connecting device 12 is formed in one piece on the wiper arm connecting rod 18, and that the arrangement of the first hinge element 18 is embodied in the conventional manner as disclosed in the prior art. On the other hand, it is also conceivable to only produce the wiper arm connecting rod 18 in one piece with the first hinge element 18 and to connect the connecting device 12 in the manner known from the prior art with the wiper arm connecting rod 16.

The basic form of a metallic sheet metal plate 100 is represented in FIG. 6, wherein the dashed lines 102, 104, 106 represent the bending edges at which the plate 100 is bent, or respectively folded. By means of appropriate folding, either a cross section of the wiper arm connecting rod 16 in accordance with FIG. 2, or a cross section of the wiper arm rod 216 in accordance with FIG. 5 can result from the representation in FIG. 6. Recesses 140, 142 can already be arranged in the sheet metal plate 100 which, following the bending process, result in the seating recesses 40, 42 of the connecting device 12.

A metallic sheet metal plate 200 represented in FIG. 7 has the initial shape for the one-piece production of the wiper arm connecting rod 16 and the first hinge element 18. For this purpose, the sheet metal plate 200 must be folded, or respectively bent, in accordance with the bending edges 202 and 204 represented by dashed lines. A U-shape in accordance with FIG. 3 then results in the area of the first hinge element, while the fold in the area of the wiper arm connecting rod 16 can be selected in accordance with the embodiment in FIG. 2 or the embodiment in FIG. 5. As can further be seen from FIG. 7, it is also possible at the same time to arrange seating recesses 206 in the sheet metal plate 200, which, following the final assembly, together with appropriate seating means and the second hinge element 22 (FIG. 1), result in the tilt hinge 20.

If the two sheet metal plates 100 and 200 are directly combined with each other in accordance with FIGS. 5 and 6, a single sheet metal plate results which, with appropriate folding and deformation, results in a hinge lever 28 in accordance with FIG. 1.

In all cases the result is a wiper arm, which is constructed flat and cost-effectively and has a pleasing design and low weight and which, with appropriate selection of the material thickness and/or with appropriate design of the cross section in the area of the wiper arm connecting rod 16, has the required stiffness.

What is claimed is:

1. A wiper device for windows of motor vehicles, having an elongated, driven wiper arm (10) guided at one end on the motor vehicle, on whose other free end section an elongated wiper blade (14), which can be placed on the window, is hinged so it can oscillate in a longitudinal axially parallel manner and around a pivot axis (44) oriented transversely to the longitudinal axes, wherein a section of the wiper blade (14) is guided between two legs (34, 36), which are arranged at a distance from each other, of a connecting device (12), which is U-shaped in cross section, the hinge means of the wiper blade (14) cooperate with hinge means of the wiper blade connecting device (12) arranged on one end of a wiper blade connecting rod (16), and the connecting rod (16) is provided at its other end with a first hinge element (18) which is a part of a tilt hinge (20), on whose other second hinge element (22) the drive means (24) of the wiper device act, wherein the wiper arm connecting rod (16) and the connecting device (12) for the wiper blade (14) have been produced in one piece from a sheet metal plate, and in a region of the wiper arm connecting rod (16) said metal plate is folded in two layers which define parallel planar surfaces in contact with one another.

2. The wiper device in accordance with claim 1, wherein the wiper arm connecting rod (16, 116, 216), the connecting device (12) for the wiper blade (14) and the first hinge element (18) of the tilt hinge (20) have been produced in one piece from a sheet metal plate.

3. The wiper device in accordance of claim 1, wherein the wiper arm connecting rod (16, 116, 216) has been stiffened by deformations of the sheet metal.

4. The wiper device in accordance with claim 1, wherein the metal plate in a region of the wiper arm connecting rod (16) is folded so that free ends of the metal plate are located one against the other.

* * * * *